United States Patent
Kaneda et al.

(10) Patent No.: US 6,646,825 B1
(45) Date of Patent: Nov. 11, 2003

(54) DATA STORAGE USING DISK MEDIA

(75) Inventors: Satoru Kaneda, Tokyo (JP); Hiro Karube, Tokyo (JP); Yuji Kaneko, Tokyo (JP); Jun Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/521,961

(22) Filed: Mar. 9, 2000

(30) Foreign Application Priority Data

Mar. 9, 1999 (JP) .......................................... 11-062167

(51) Int. Cl.[7] .............................................. G11B 5/596
(52) U.S. Cl. ...................................... 360/78.05; 360/63
(58) Field of Search .............................. 360/78.05, 61, 360/63, 75, 78.12

(56) References Cited

U.S. PATENT DOCUMENTS 5,901,010 A * 5/1999 Glover et al. ......... 360/78.05 X
6,262,860 B1 * 7/2001 Ishida ..................... 360/78.05
6,292,320 B1 * 9/2001 Mason et al. ........ 360/78.05 X
6,483,659 B1 * 11/2002 Kobayashi et al. ...... 360/78.04

FOREIGN PATENT DOCUMENTS

| JP | A 2-218075 | 8/1990 |
| JP | A 3-105772 | 5/1991 |
| JP | A 5-47124 | 2/1993 |
| JP | 9330572 | 12/1997 |
| JP | A 10-293975 | 11/1998 |

* cited by examiner

Primary Examiner—David Hudspeth
Assistant Examiner—Mitchell Slavitt
(74) Attorney, Agent, or Firm—Young & Thompson (57) ABSTRACT

A first actuator for controlling positions of all of a plurality of heads within a wide area and a plurality of second actuators for individually controlling the heads within small areas are provided. When two or more of the heads are in write or read state, one or more of the heads, which are not in write or read state, is preliminarily move to a track position to be accessed next.

15 Claims, 6 Drawing Sheets

DATA STORAGE USING DISK MEDIA

CROSS REFERENCE TO RELATED APPLICATIONS

The present invention claims priority from Japanese Patent Application No. 11-062167 filed Mar. 9, 1999, the contents of which are incorporated herein by reference.

BACKGROUND OF THE INVENTION

1. Field of the Invention

The present invention is utilized as a data storage device for storing a large amount of data. The present invention relates to a technique for performing a simultaneous write or read for a plurality of channels by using a plurality of heads accessing a plurality of rotary memory media such as disks or cylinders. The present invention relates to an information storage device capable of storing an information with high density and of transferring it at high rate. Particularly, the present invention relates to a technique, in which a plurality of heads access a plurality of coaxially rotating rotary storage media and positions of the heads are controlled by using a two-stage actuator construction, and to a signal format therefor.

2. Description of the Related Art

Figure 1:
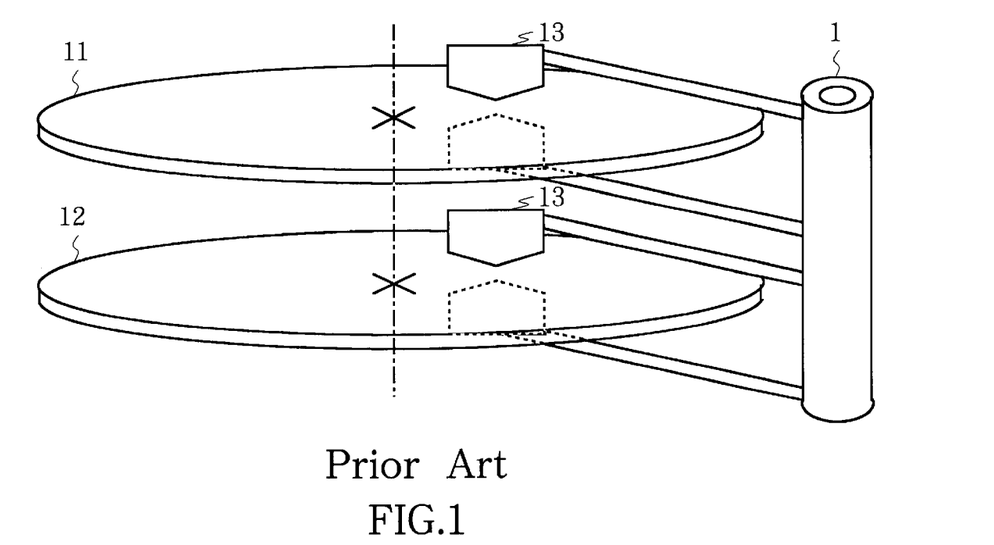
FIG. 1 illustrates a positional relation between recording media and heads of a conventional rotary information storage device.

A rotary information storage device, e.g., a disk storage device, for simultaneously writing or reading a plurality of channels of a single rotary storage media or a plurality of storage media by a plurality of heads accessing the storage media has been known. FIG. 1 shows an example of a conventional hard magnetic disk device. In FIG. 1, magnetic material layers are formed on both surfaces of each of coaxially rotating two magnetic disks 11 and 12 and four heads 13 each provided for each surface of the magnetic disks access the magnetic disks. The heads 13 is totally driven by a single actuator 1 to control positions of the heads. Although the number of the rotary storage media is two in the shown example, it may be four or eight in order to increase the storage capacity.

Figure 2:
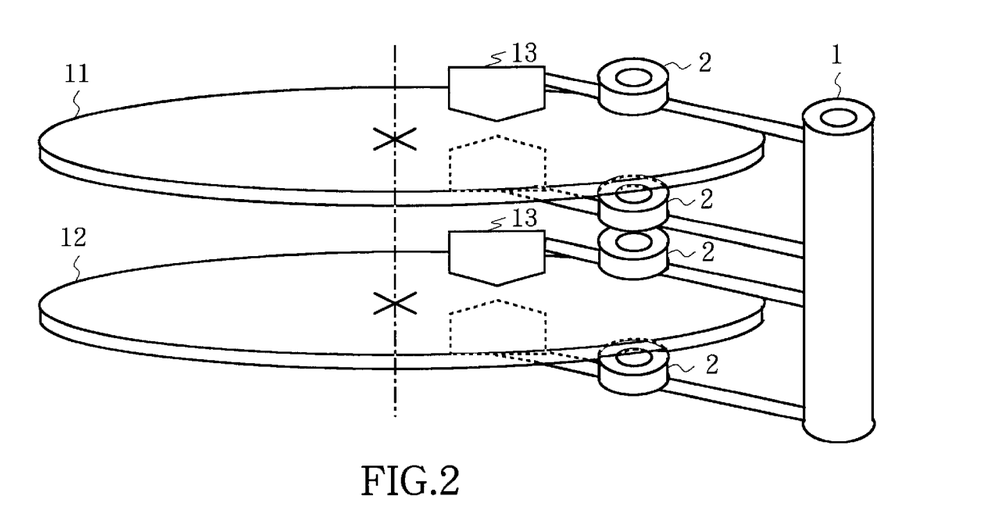
FIG. 2 illustrates a positional relation between recording media and heads of a rotary information storage device according to an embodiment of the present invention.

The present inventors have been developed an actuator, which has a two-stage construction, for positional control of a plurality of heads, which is disclosed in Japanese Patent Application laid-open No. H9-330572. FIG. 2 shows the disclosed actuator having the two-stage construction. In FIG. 2, the actuator includes a first actuator 1 for totally driving a plurality of heads 13 and totally controlling positions thereof within a large area and a plurality of second actuators 2 each for driving an associated head to control a position of the associated head within a small area.

In the rotary information storage device shown in FIG. 2, a joint is provided on an intermediate position of each arm having a forward half supporting a head and a rearward half rotatably connected to the first actuator 1, and the second actuators 2 are provided on the respective joints. That is, all of the arms are rotatable simultaneously by the first actuator 1 within a large area and the forward halves of the arms supporting the respective heads 13 are rotatable about the joints, on which the second actuators 2 are provided, in parallel to surfaces of disks within a limited area independently from each other. That is, each second actuator 2 controls a rotation angle of a forward half of the forward half of the associated arm according to a drive signal. The four heads 13 totally are moved in radial direction of the disks 11 and 12 with a rotation of the first actuator 1 and the positions of the four heads 13 are finely controlled within small areas by the second actuators 2 independently from each other.

In general, the important performance of the rotary information storage device depends upon the recording capacity and the data transfer rate. In order to increase the storage capacity of such device, it is usual to increase the recording density of the storage medium, that is, to reduce a distance between adjacent tracks provided on the storage medium and to reduce a distance between the storage medium and the head. Therefore, in the rotary information storage device shown in FIG. 1, which can not control the positions of the heads individually, the accuracy of the head position control limits the recording density. On the other hand, in order to increase the write or read speed, that is, the data transfer rate, the rotation speed of the storage medium must be increased. When the rotation speed of the storage medium is increased, the head position control speed must be increased correspondingly. Therefore, the actuator must be powerful enough and must work precisely.

In view of this, the rotary information storage device shown in FIG. 2 is preferable in increasing the recording density as well as the data transfer rate, compared with the conventional rotary information storage device shown in FIG. 1. That is, in the rotary information storage device shown in FIG. 2, which has the second actuators 2 provided on the joints of the respective arms, it is possible to finely control the positions of the respective heads 13 individually and, therefore, to perform a tracking precisely individually even when the distance between the adjacent tracks is reduced. Further, since it is possible to reduce a length of the forward half of the arm measured from the second actuator 2 to the position of the head, it is possible to increase the position control speed.

SUMMARY OF THE INVENTION

In order to utilize the rotary information (disk) storage device shown in FIG. 2, which is provided with the second actuators 2, the control logic and the signal format used in the device shown in FIG. 1 can not be applied to the device shown in FIG. 2 as they are. Further, the present inventors have found that, by utilizing the rotary information storage device shown in FIG. 2, it is possible to continuously utilize the tracks provided on the storage media by alternately controlling the head positions.

The present invention was made in view of the state of art and has an object to provide a head position control unit applicable to a rotary information storage device including a first actuator for totally controlling positions of a plurality of heads within a large area and a corresponding number of second actuators for individually controlling the positions of the heads within a small areas, respectively.

Another object of the present invention is to provide a circuit construction capable of increasing the recording density and the storage capacity of a rotary information storage device.

Another object of the present invention is to improve the data transfer rate of a rotary information storage device by performing the write or read operation by utilizing a plurality of heads simultaneously.

A further object of the present invention is to provide a circuit construction by which a rotary information storage device can effectively utilize tracks provided on a recording media continuously.

Another object of the present invention is to reduce the cost of a rotary information storage device for a given recording capacity.

The present invention is applied to a rotary information storage device according to the present invention comprising three or more heads, which are coaxially rotated to read or write data from or to tracks provided on at least one recording medium, a first actuator for totally driving all of the heads to control positions of the heads totally within a large area and a plurality of second actuators for driving the heads individually to control positions of the heads within small areas, respectively. In the present invention, all of the heads are not used simultaneously for data read or data write. That is, the present invention is featured by that at least one head, which is not in a read or write state, is moved, in advance, to a track to be accessed next during a time period in which other heads execute data read or data write.

The present invention includes a head positioning circuit for controlling the first actuator and the second actuators. The head positioning circuit comprises:

i) a servo tracking unit for positioning the heads to respective track positions; and ii) a seek unit for moving at least one head, which is not in data read or data write state, to a track position to be accessed next, in advance, during a time period in which two or more heads are in data read or data write state.

The number of the heads each controlled by two kinds of actuators can be increased when the above mentioned structure is used. As also mentioned, all of the heads do not simultaneously perform the data read or data write. At least one of the heads is released from the data read or data write operation and is controlled such that, in order to use the one head for data read or write with a next timing, it is moved in advance to a desired track position of the rotary storage medium. With this scheme, it is possible to continuously perform the data read or write operation throughout the operation time of the rotary information storage device.

In the present invention, it is preferable that the length of data written in the tracks of the rotary information storage media and the length of data read out from the tracks of the rotary storage media are fixed. That is, the present invention comprises a controller including a write control unit for writing an input data having a fixed length on the tracks of the rotary storage media through the heads and a read control unit for converting data read out from the tracks of the rotary storage media into an output data having a fixed length.

The present invention further comprises a driver for cutting out the fixed length data from a continuous data or synthesizing a continuous data from fixed length data. That is, the driver includes a data divider for dividing the continuous input data to the fixed length input data and a data combiner for synthesizing the fixed length output data to a continuous data.

In the present invention, a write or read time of the fixed length data is preferably an integer multiple of a seek time required to make the head movable by the seek unit. Further, times required by the respective heads to write or read a plurality of the fixed length data related to a continuous data are set as a continuous time series so that the tracks on the rotary storage media can be used as a physically continuous track.

The head positioning circuit may comprise a unit, which, when one of the heads is set in a data read or write state, starts the seek operations of the remaining heads substantially simultaneously with the setting of the one head. Further, it is preferable that the head positioning circuit controls the rotary information storage device such that a fixed length data related to a continuous data is continuously written in another (or adjacent) track.

The rotary information storage medium may take in the form of a magnetic disk, an optical disk, a magneto-optical (MO) disk or other disk. Further, although a single rotary storage medium may be used in the present invention, it is possible to use two, four or more rotary storage media, by employing a structure in which a plurality of rotary storage media are mechanically coaxially supported on a single rotary shaft. It is of course possible to increase the number of the heads for accessing the rotary storage media.

With such construction of the rotary information storage device, it is possible to record data on the rotary storage media without leaving any area of the rotary storage media, which is left unused. Further, it is possible to read or write data continuously in time. Therefore, the effective recording density is increased and the cost for unit amount of information (mega-byte) to be recorded can be reduced. Since it is possible to substantially eliminate the latency for read or write, it is possible to increase the data transfer speed.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

A positional relation between rotary storage media, heads and actuators of a rotary information storage device according to the present invention will be described with reference to FIG. 2. Magnetic disks 11 and 12 are mechanically supported coaxially by a rotary shaft, which is shown by a chain line and rotated at high speed by means of a motor, which is not shown. Magnetic layers are formed on both surfaces of each of the magnetic disks 11 and 12 so that data can be recorded on the both surfaces. A magnetic head 13 is provided for each magnetic layer for accessing tracks provided thereon. A total of four magnetic heads 13 are driven simultaneously to control their positions by a first actuator 1. That is, with a rotation of the first actuator 1 according to a drive signal (electric signal), arms having one ends provided with the magnetic heads 13 and the other ends rotatably supported by the first actuator 1 are driven simultaneously to control the access positions of the magnetic heads 13 within large areas, respectively.

Each arm has a joint on which a second actuator 2 is provided. Drive signals to the second actuators 2 are supplied individually through a wiring extending along the arms. Upon the drive signals supplied to the respective second actuators 2, the second actuators 2 are rotated about the joints independently to control positions of the magnetic heads 13 within small areas respectively.

Figure 3:
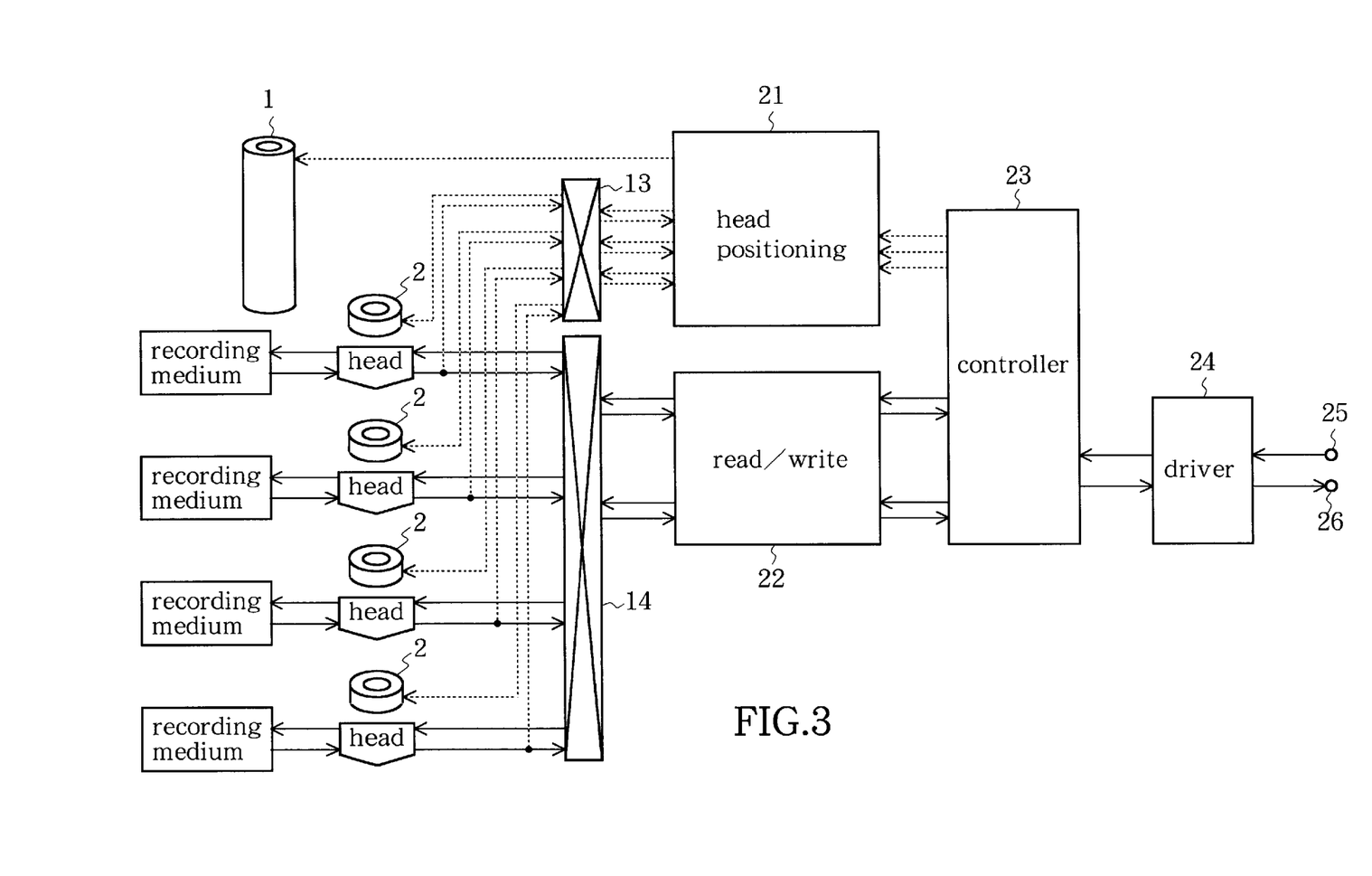
FIG. 3 is a block diagram of a control device of the rotary information storage device of the embodiment shown in FIG. 2.

FIG. 3 is a block diagram showing an embodiment of a control device of the rotary information storage device of the present invention. In FIG. 3, the mechanical relation between the first actuator 1, the second actuators 2, the magnetic heads 13 and the rotary information storage media was described previously with reference to FIG. 2. The drive signal is supplied from the head positioning circuit 21 to the first actuator 1. The drive signals are individually supplied from the head positioning circuit 21 through a switch circuit 14 to the second actuators 2, respectively.

Bi-directional read/write signals are transmitted between a read/write control circuit 22 and the respective magnetic heads 13 through a switch circuit 15, respectively. Read signals from the respective magnetic heads are branched and inputted to the head positioning circuit 21 through the switch circuit 14 and utilized for a tracking control. That is, the read signals from the magnetic heads 13 are branched and taken in to perform a servo control such that the magnetic heads precisely trace tracks set on the rotary information storage media.

The read/write signals supplied to the respective magnetic heads are constituted with data having fixed length. In order to realize this, a controller 23 is provided. That is, the controller 23 comprises a write control unit for writing the fixed length input data on the tracks of the rotary information storage media through the magnetic heads and a read control unit for converting data read out from the tracks of the rotary storage media through the magnetic heads into fixed length output data.

Further, a driver 24 for converting the fixed length data into a continuous data or vice versa is provided. The driver 24 comprises a dividing unit for dividing the continuous data inputted to an input terminal 25 to fixed length input data and a data combining unit for combining the fixed length output data to the continuous data and outputting it to an output terminal 26.

Figure 4:
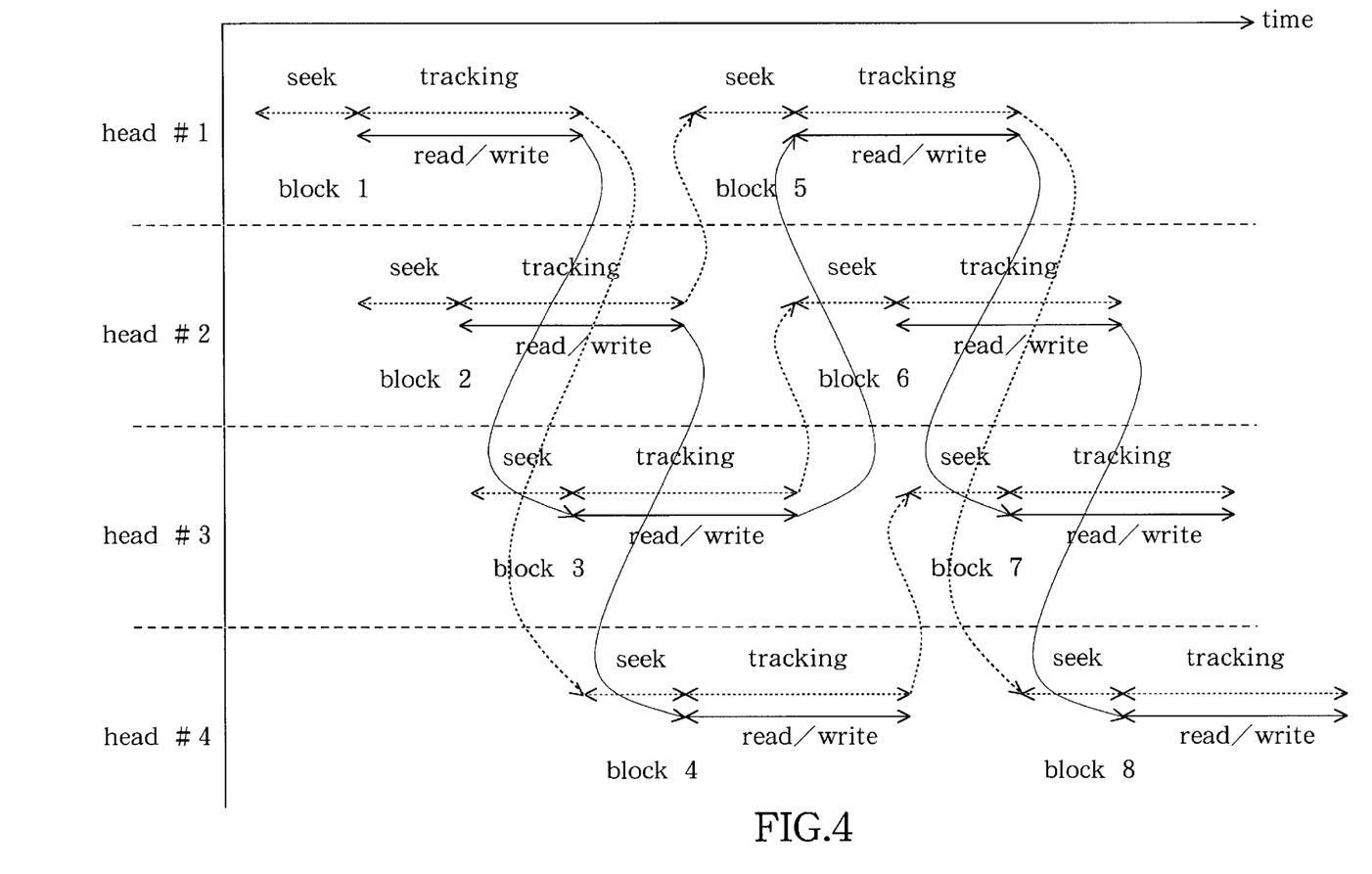
FIG. 4 is a time chart for explaining an example of operation of the control device shown in FIG. 3.

An operation of this control device will be described. A first example of the operation is shown in FIG. 4. Seek operations of the four magnetic heads #1 to #4 for accessing desired track positions are performed respectively and the magnetic heads execute read/write operations when the magnetic heads access the respective desired tracks. The positions of the magnetic heads are tracking-controlled by a servo system throughout the read/write period. The read/write operation is performed for the fixed length data as mentioned previously.

In FIG. 4, the seek of the magnetic head #1 is performed for a data block 1, which is a fixed length data, and a read/write operation therefor is executed. Simultaneously with a start of the read/write operation of the magnetic head #1, a seek operation of the magnetic head #2 is performed and, then, a read/write for a data block 2, which is also a fixed length data, is executed. In the example shown in FIG. 4, the read/write time is set to a twice the seek time. Simultaneously with a start of the read/write operation of the magnetic head #2, a seek operation of the magnetic head #3 is performed. Immediately after the read/write operation of the magnetic head #1 for the data block 1 completes, a read/write operation of the magnetic head #3 for the data block 3 is executed. Simultaneously with the start of the read/write operation of the magnetic head #3, a seek operation of the magnetic head #4 is performed. The position control signal, which is performing the tracking control for the magnetic head #1, is switched by the switch circuit 14 to a seek operation of the head #4.

After this operation reaches a stationary state in this manner, two of the four magnetic heads execute read/write operations and another of the remaining magnetic heads executes the seek operations, at an arbitrary timing. Upon the position control signal, the seek operation and the tracking are repeated alternately, so that the read/write operation is executed continuously throughout the operation time of the rotary storage device.

Figure 5:
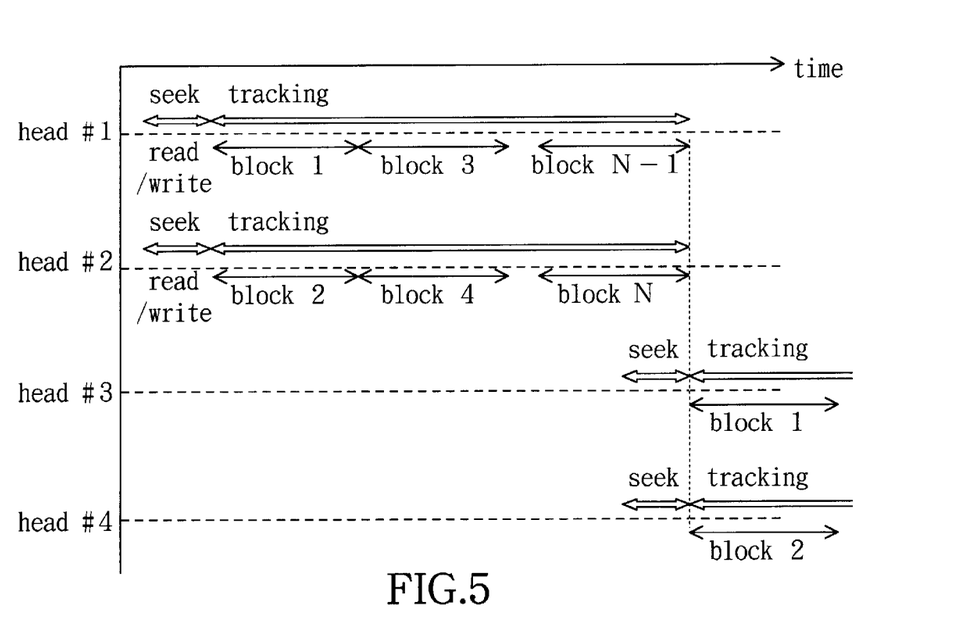
FIG. 5 is a time chart for explaining a second of operation of the control device shown in FIG. 3.

FIG. 5 shows a second example of the operation. The seek operations of the four magnetic heads #1 to #4 for accessing desired track positions are performed respectively and the magnetic heads execute read/write operations when the heads access the respective desired tracks, as in the first example. In the case shown in FIG. 5, however, two magnetic heads, that is, the magnetic heads #1 and #2 are shifted from the seek operation to the read/write operation simultaneously to process successive fixed length block data alternately. In other words, once the read/write is executed, the read/write operation is executed continuously through N block data alternately. Throughout this operation period, the magnetic heads #1 and #2 perform the read/write operation continuously under the tracking control. In this case, the magnetic heads #1 and #2 stay on one and another of the tracks of the rotary information storage media for a time required to continuously read/write data corresponding to N/2 blocks. Thus, it is possible to continuously read/write data from the respective tracks. That is, it is possible to effectively utilize the rotary information storage media without leaving any empty portion in which no data is recorded.

Figure 6:
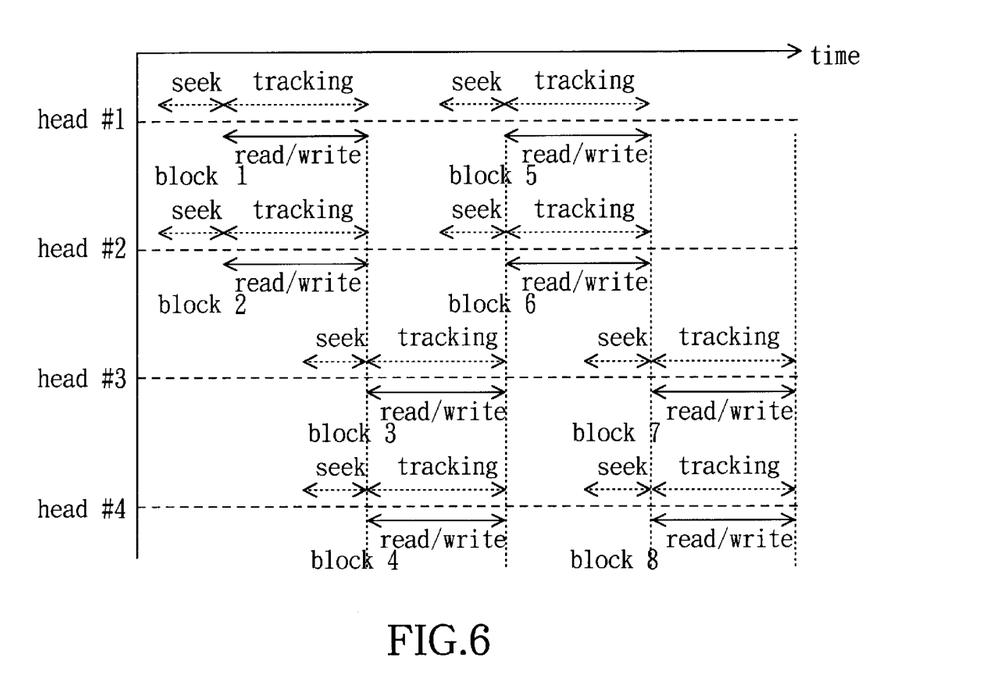
FIG. 6 is a time chart for explaining a third of operation of the control device shown in FIG. 3.

FIG. 6 shows a third example of the operation of the rotary information storage device of the present invention. The seek operations of the four magnetic heads #1 to #4 for accessing desired track positions are performed respectively and the magnetic heads execute read/write operations when the heads access the respective desired tracks, as in the first example. In the case shown in FIG. 6, however, the seek operations and the read/write operations of first two of the four magnetic heads are started simultaneously and the read/write operations of them are completed when the read/write of data corresponding to one fixed length data block are executed. The seek operations of the remaining two heads are started at a time before the read/write operations of the first two heads are completed and the read/write operations of the remaining heads are executed immediately after the read/write operations of the first two heads are completed. The first two magnetic heads and the remaining magnetic heads execute the read/write operations alternately in this manner so that the read/write operation of the rotary information storage device is continuously in time between the two pairs of the magnetic heads. Therefore, the read/write operations of the four magnetic heads of the rotary information storage device are continuous in time and the track positions of the magnetic heads can be set such that these tracks are successive in time.

Although the present invention has been described with reference to the case where the rotary information storage media comprises two magnetic disks each having surfaces formed with a magnetic layer and a magnetic head is provided for each magnetic layer, the rotary information storage media may be a magnetic cylinder when a large capacity information storage device is designed. Further, the number of the magnetic heads for two rotary information storage media is not limited to four. The number of rotary information storage media may be increased to an arbitrary number and the number of the magnetic heads may also be increased arbitrarily. In such case, the freedom in setting the read/write operation timing and the seek operation timing is further increased.

Figure 7:
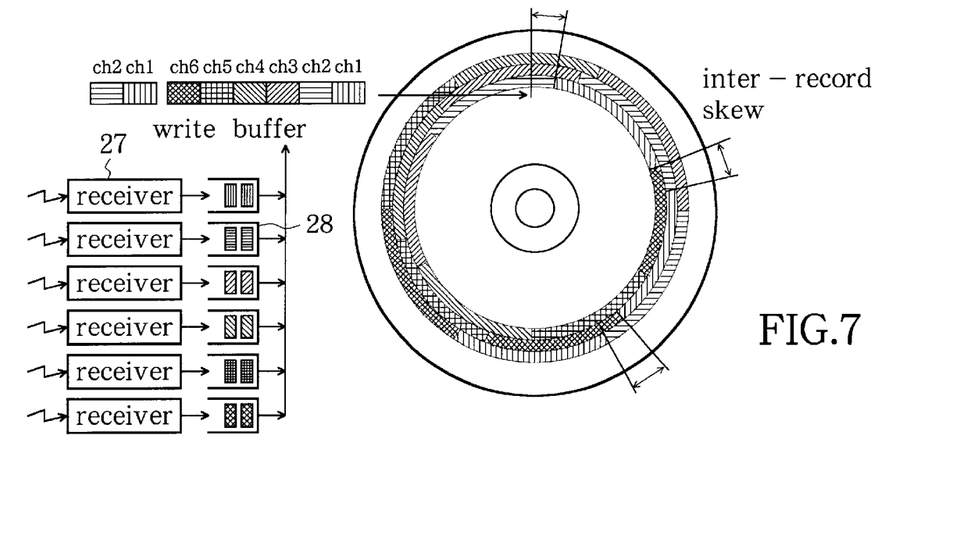
FIG. 7 illustrates a write operation of a video data stream on a magnetic disk.
Figure 8:
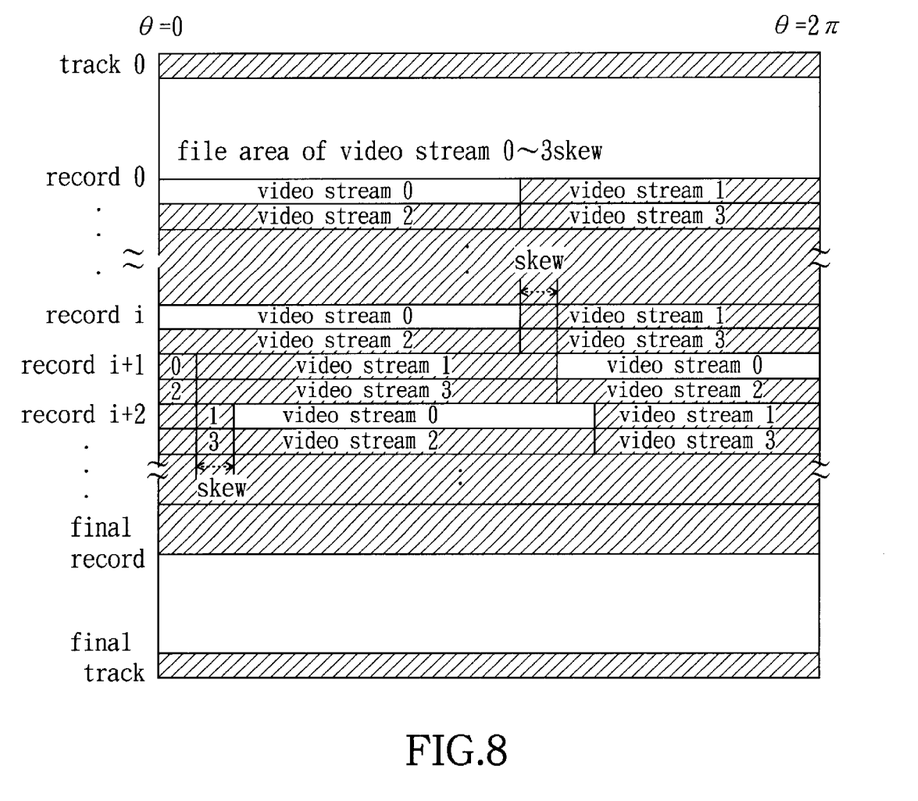
FIG. 8 illustrates a write operation of a video data stream with skew.
Figure 9:
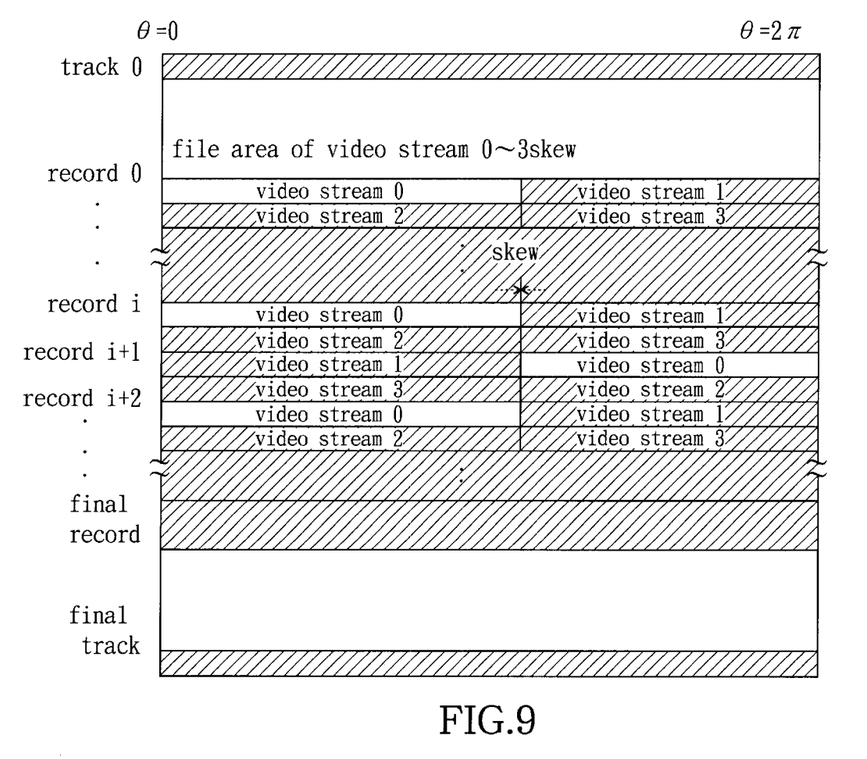
FIG. 9 illustrates a write operation of a video data stream without skew.

The video data stream written in the magnetic disk will be described in more detail with reference to FIGS. 7 to 9, in which FIG. 7 illustrates a write operation of video data stream on a magnetic disk, FIG. 8 illustrates a write operation of a video data stream with skew and FIG. 9 illustrates a write operation of a video data stream without skew.

As shown in FIG. 7, a video data stream is received by receivers 27 and temporarily stored in respective write buffers 28. The data read out from the write buffers 28 are inputted to the input terminal 25 shown in FIG. 3 and written in the magnetic disk by the magnetic heads through the driver 24, the controller 23, the read/write control circuit 22 and the switch circuit 14. The recording state on the magnetic disk is shown in FIG. 7. In FIG. 7, the data of the video data stream includes the inter-record skew. When the inter-record skew is included in the data of the video data stream, the data position is shifted correspondingly to an amount of the skew, as shown in FIG. 8.

When the present invention is applied to that case, it is possible to make the skew substantially zero, as shown in FIG. 9. Therefore, in the present invention, it is possible to improve the data transfer rate and to increase the memory capacity by increasing the recording density. Since, therefore, the recording medium can be utilized efficiently, it is possible to reduce the cost of the storage device for unit memory capacity.

Figure 10:
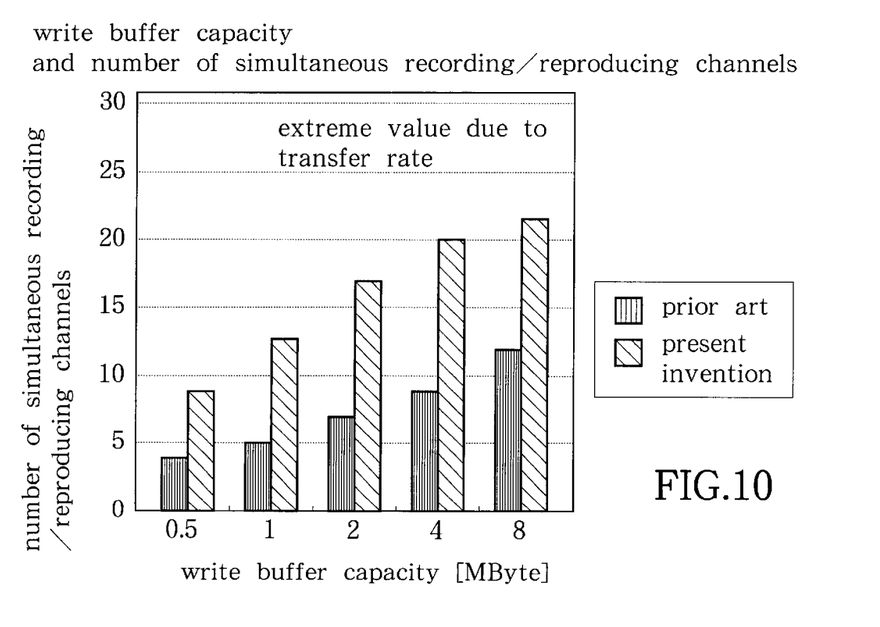
FIG. 10 is a comparative data of the rotary information storage device according to the present invention and the conventional rotary information storage device.

FIG. 10 shows the effect of the present invention compared with that of the conventional device. In FIG. 10, an abscissa indicates the memory capacity of the write buffer 28 and an ordinate indicates the number of simultaneous recording/reproducing channels. The conditions under which the comparison was performed are shown in the Table 1 below.

TABLE 1

Comparison Conditions

| Parameter | Value |
|---|---|
| rotation number of disk | 3600 rpm |
| transfer rate | 150 Mbps |
| average track length | 305 Kbyte |
| average seek time | 10 ms |
| inter-record seek time | 1 ms |
| moving picture bit rate | 6 Mbps |

It is clear from Table 1 that, for the write buffer 28 having the same memory capacity, the number of simultaneous recording/reproducing channels in the present invention is substantially improved compared with that of the conventional device. For example, in a case where the number of simultaneous recording/reproducing channels is 10, the conventional device requires the memory capacity of 8 Mbyte. However, the memory capacity in the present invention is only 1 Mbyte.

As described hereinbefore, according to the present invention, the seek time for which the head is moving to a next track corresponds to the time for which other heads are executing the read/write operation, so that the read/write operation of the storage device is continuously executed. Therefore, in the present invention, it is possible to improve the data transfer rate. Further, in the present invention, the head position is finely controlled. Therefore, it is possible to increase the memory capacity by increasing the recording density. Further, since it is possible to continuously set the tracks on the recording media, it is possible to utilize the recording media efficiently. As the total effect of the present invention, it is possible to reduce the cost of the storage device for memory capacity.

What is claimed is:

1. A disk storage device comprising:

three or more heads, which are coaxially rotated to read or write data from or to tracks provided on at least one recording medium;

a first actuator for totally driving all of said heads to control positions of said heads within a large range;

a plurality of second actuators for driving said heads individually to control positions of said heads within small ranges, respectively; and a head positioning circuit, said head positioning circuit comprising i) servo tracking means for positioning said heads to respective track positions; and ii) seek means for preliminarily moving at least one of said heads, which is not in data read or data write state, to a track position to be accessed next during a time period in which two or more of said heads are in data read or data write state.

2. A disk storage device as claimed in claim 1, further comprising a controller, said controller comprising:

write control means for writing fixed length input data on said tracks of said recording medium through said heads; and read control means for deriving data read out from said tracks of said recording medium through said heads as fixed length output data.

3. A disk storage device as claimed in claim 2, further comprising a driver, said driver comprising:

data division means for dividing a continuous input data to a plurality of said fixed length input data; and data combining means for combining said fixed length output data to obtain a continuous data.

4. A disk storage device as claimed in claim 3, wherein a write or read time of said fixed length data is an integer multiple of a seek time for moving said heads by said seek means.

5. A disk storage device as claimed in claim 4, wherein times required to read or write the plurality of fixed length data related to a continuous data are set continuous in time between a plurality of different heads.

6. A disk storage device as claimed in claim 5, wherein said head positioning circuit comprises means for starting, at substantially same time when one of said heads is set to a read or write state, seek operations of the remaining heads.

7. A disk storage device as claimed in claim 3, wherein said head positioning circuit comprises means for continuously writing a fixed length data related to a continuous data in one or an adjacent track.

8. A disk storage device as claimed in claim 1, wherein said seek means moves, at any time, only one head to a track position to be next accessed.

9. A disk storage device as claimed in claim 8, wherein said seek means moves each of the heads in sequence to a track position to be next accessed.

10. A disk storage device as claimed in claim 8, wherein, said seek means moves each of the heads in sequence to a track position to be next accessed, and a start of a seek operation of a next head commences simultaneously with a start of a read or write operation of an immediately preceding head.

11. A disk storage device as claimed in claim 8, wherein, said seek means moves each of the heads in sequence, one at a time, to a track position to be next accessed, and a start of a seek operation of a next head commences is synchronized with a start of a read or write operation of an immediately preceding head.

12. A disk storage device as claimed in claim 1, wherein, there are at least four heads, said seek means moves, at any time, only one head to a track position to be next accessed.

13. A disk storage device as claimed in claim 1, further comprising a read-write controller configured so that the heads are sequentially read, one at a time.

14. A disk storage device as claimed in claim 13, wherein the read-write controller partially overlaps a read-write period for each of the heads with immediately proceeding and immediately following read-write periods corresponding to two other heads.

15. A disk storage device comprising:

three or more heads, which are coaxially rotated to read or write data from or to tracks provided on at least one recording medium;

a first actuator for totally driving all of said heads to control positions of said heads within a large range;

a plurality of second actuators for driving said heads individually to control positions of said heads within small ranges, respectively; and a head positioning circuit, said head positioning circuit comprising
  i) servo tracking means for positioning said heads to respective track positions;
  ii) seek means for preliminarily moving at least one of said heads, which is not in data read or data write state, to a track position to be accessed next during a time period in which two or more of said heads are in data read or data write state; and
  iii) means for starting, at substantially same time when one of said heads is set to a read or write state, seek operations of at least two remaining heads.

* * * * *